United States Patent [19]

van Lengerich et al.

[11] Patent Number: 5,124,161
[45] Date of Patent: Jun. 23, 1992

[54] FILLED, MICROWAVE EXPANDABLE SNACK FOOD PRODUCT AND METHOD AND APPARATUS FOR ITS PRODUCTION

[75] Inventors: Bernhard H. van Lengerich, Ringwood; Wen C. Lou, Morris Plains, both of N.J.

[73] Assignee: Nabisco Brands, Inc., Parsippany, N.J.

[21] Appl. No.: 362,676

[22] Filed: Jun. 7, 1989

[51] Int. Cl.⁵ .................. A23L 1/18; A23P 1/12
[52] U.S. Cl. .................. 426/94; 426/138; 426/283; 426/284
[58] Field of Search ............ 426/94, 138, 283, 284

[56] References Cited

U.S. PATENT DOCUMENTS

| | | | |
|---|---|---|---|
| 1,625,022 | 4/1927 | Fousek . | |
| 2,120,138 | 6/1938 | Mathews et al. | 99/81 |
| 2,183,693 | 12/1939 | Rasch | 107/14 |
| 2,488,046 | 11/1949 | Werner et al. | 107/29 |
| 2,582,542 | 1/1952 | Hein | 107/29 |
| 2,838,012 | 6/1958 | Weidenmiller et al. | 107/29 |
| 2,838,013 | 6/1958 | Weidenmiller et al. | 107/29 |
| 3,021,220 | 2/1962 | Going et al. | 99/92 |
| 3,064,589 | 11/1962 | Genich | 107/29 |
| 3,158,486 | 11/1964 | Mork et al. | 99/86 |
| 3,195,868 | 7/1965 | Loomans et al. | 259/104 |
| 3,215,094 | 11/1965 | Oldershaw et al. | 107/54 |
| 3,275,449 | 9/1966 | Fritzberg | 99/80 |
| 3,393,074 | 7/1968 | Ehrlich | 99/92 |
| 3,424,590 | 1/1969 | Booras | 99/90 |
| 3,458,321 | 7/1969 | Reinhart | 99/80 |
| 3,462,276 | 8/1969 | Benson | 99/81 |
| 3,480,445 | 11/1969 | Slaybaugh | 99/83 |
| 3,482,992 | 12/1969 | Benson | 426/94 |
| 3,490,750 | 1/1970 | Brennan | 259/104 |
| 3,492,127 | 1/1970 | Ketch et al. | 99/86 |
| 3,615,675 | 10/1971 | Wisdom | 99/83 |
| 3,682,652 | 8/1972 | Corbin et al. | 99/83 |
| 3,692,535 | 9/1972 | Norsby | 99/92 |
| 3,732,109 | 5/1973 | Poat et al. | 99/83 |
| 3,753,729 | 8/1973 | Harms et al. | 99/82 |
| 3,767,421 | 10/1973 | Gulstad et al. | 426/153 |
| 3,767,422 | 10/1973 | Levitz | 426/152 |
| 3,769,034 | 10/1973 | Dreier, Jr. et al. | 426/151 |
| 3,861,287 | 1/1975 | Manser | 99/348 |
| 3,908,025 | 9/1975 | Miller et al. | 426/623 |
| 3,922,369 | 11/1975 | Glicksman et al. | 426/548 |
| 3,987,207 | 10/1976 | Spaeti et al. | 426/99 |
| 4,020,187 | 4/1977 | McCulloch et al. | 426/72 |
| 4,038,481 | 7/1977 | Antrim et al. | 536/56 |
| 4,039,168 | 8/1977 | Caris et al. | 259/9 |
| 4,044,159 | 8/1977 | Lutz | 426/302 |
| 4,044,661 | 8/1977 | Balaz | 99/355 |

(List continued on next page.)

FOREIGN PATENT DOCUMENTS 1247926  1/1989  Canada .................. 99/113

(List continued on next page.)

OTHER PUBLICATIONS

Anderson et al., "Gelatinization of Corn Grits by Roll Cooking, Extrusion Cooking and Steaming," *Die Strake* 22, Jahrg. Nr. 4 pp. 130–134.

(List continued on next page.)

*Primary Examiner*—Donald E. Czaja
*Assistant Examiner*—Mary S. Mims

[57] ABSTRACT

The present invention relates to a filled, elongate half product which can be expanded (i.e., puffed) when subjected to microwaves. The half product comprises an elongate outer casing formed from a dough containing a cereal material, water, and, optionally, starch, microwave absorptive materials (e.g., sugar or salts), and emulsifiers. Within the outer casing is a filling formed from an edible oil and flavoring. The half product of the present invention is prepared by mixing the ingredients which form the dough, cooking the dough at an elevated temperature and pressure to gelatinize the starch, venting the cooked dough to reduce its moisture content and temperature, cooling the cooked dough, coextruding the cooked dough and filling material to form a filled half product, and cutting the resulting extrudate cross-sectionally. In one preferred version of the present invention, a longitudinal slice is cut through the casing as it is extruded but prior to cross-sectional cutting to permit the half product to curl open as it puffs during microwaving. The mixing, cooking, venting, and cooling steps are conducted in a co-rotating twin screw extruder.

19 Claims, 3 Drawing Sheets

U.S. PATENT DOCUMENTS

| | | | |
|---|---|---|---|
| 4,099,455 | 7/1978 | Wenger et al. | 99/450.1 |
| 4,104,463 | 8/1978 | Antrim et al. | 536/56 |
| 4,126,710 | 11/1978 | Jaworshi et al. | 426/589 |
| 4,128,051 | 12/1978 | Hildebolt | 99/348 |
| 4,190,410 | 2/1980 | Rhodes | 425/239 |
| 4,217,083 | 8/1980 | Machuque | 425/198 |
| 4,218,480 | 8/1980 | Dyson et al. | 426/19 |
| 4,219,580 | 8/1980 | Torres | 426/549 |
| 4,225,630 | 9/1980 | Pitchon | 426/623 |
| 4,239,906 | 12/1980 | Antrim et al. | 536/56 |
| 4,245,552 | 1/1981 | Small et al. | 99/483 |
| 4,251,551 | 2/1981 | Van Halle et al. | 426/94 |
| 4,259,051 | 3/1981 | Shatila | |
| 4,277,464 | 7/1981 | Reussner et al. | 424/177 |
| 4,285,271 | 8/1981 | Falck et al. | 99/348 |
| 4,313,966 | 2/1982 | Basa et al. | 426/250 |
| 4,318,931 | 3/1982 | Schiffman et al. | 426/243 |
| 4,322,202 | 3/1982 | Martinez | 425/208 |
| 4,344,975 | 8/1982 | Seiler | 426/285 |
| 4,350,713 | 9/1982 | Dyson et al. | 426/243 |
| 4,379,171 | 4/1983 | Furda et al. | 426/291 |
| 4,394,395 | 7/1983 | Rostagno et al. | 426/285 |
| 4,409,250 | 10/1983 | Van Hulle et al. | 426/242 |
| 4,418,088 | 11/1983 | Cantenot | 426/549 |
| 4,431,674 | 2/1984 | Fulger et al. | 426/18 |
| 4,438,146 | 3/1984 | Colby et al. | 426/448 |
| 4,454,804 | 7/1984 | McCulloch | 99/348 |
| 4,455,333 | 6/1984 | Hong et al. | 426/94 |
| 4,465,447 | 8/1984 | Cheigh et al. | 425/72 |
| 4,465,452 | 8/1984 | Masuzawa | 425/308 |
| 4,478,857 | 10/1984 | Stauss | 426/72 |
| 4,492,250 | 1/1985 | Levine | 425/142 |
| 4,497,850 | 2/1985 | Gould et al. | 426/560 |
| 4,500,558 | 2/1985 | Fulger et al. | 426/463 |
| 4,503,080 | 3/1985 | Brabbs et al. | 426/94 |
| 4,563,358 | 1/1986 | Mercer et al. | 426/89 |
| 4,568,550 | 2/1986 | Fulger et al. | 426/19 |
| 4,568,551 | 2/1986 | Seewi et al. | 426/99 |
| 4,608,261 | 8/1986 | MacKenzie | 426/242 |
| 4,618,499 | 10/1986 | Wainwright | 426/283 |
| 4,650,685 | 3/1987 | Persson et al. | 426/285 |
| 4,661,360 | 4/1987 | Smith | 426/94 |
| 4,664,921 | 5/1987 | Seiden | 426/94 |
| 4,668,519 | 5/1987 | Dartey et al. | 426/548 |
| 4,685,878 | 8/1987 | Pinto | 425/202 |
| 4,693,899 | 9/1987 | Hong et al. | 426/94 |
| 4,741,264 | 5/1988 | McPeak | 99/483 |
| 4,752,484 | 6/1988 | Pflaumer et al. | 426/94 |
| 4,756,921 | 7/1988 | Calandro et al. | 426/560 |
| 4,762,723 | 8/1988 | Strong | 426/283 |
| 4,764,388 | 8/1988 | Sullivan et al. | 426/311 |
| 4,770,890 | 9/1988 | Giddey et al. | 426/549 |
| 4,771,915 | 9/1988 | Cand et al. | 222/56 |
| 4,777,057 | 10/1988 | Sugisawa et al. | 426/412 |
| 4,778,690 | 10/1988 | Sabel, Jr. et al. | 426/560 |
| 4,786,514 | 11/1988 | Wiedmann | 426/231 |

(List continued on next page.)

FOREIGN PATENT DOCUMENTS

| | | |
|---|---|---|
| 0052046 | 5/1982 | European Pat. Off. . |
| 0098642 | 1/1984 | European Pat. Off. . |
| 102232 | 3/1984 | European Pat. Off. . |
| 0134322 | 3/1985 | European Pat. Off. . |
| 0145550 | 6/1985 | European Pat. Off. . |
| 0153094 | 8/1985 | European Pat. Off. . |
| 0213007 | 3/1987 | European Pat. Off. . |
| 0251375 | 1/1988 | European Pat. Off. . |
| 0252270 | 1/1988 | European Pat. Off. . |
| 252270 | 1/1988 | European Pat. Off. . |
| 0266958 | 5/1988 | European Pat. Off. . |
| 0275878 | 7/1988 | European Pat. Off. . |
| 0296039 | 12/1988 | European Pat. Off. . |
| 3238791 | 4/1984 | Fed. Rep. of Germany . |
| 2602398 | 2/1988 | France . |
| 0173040 | of 1984 | Japan . |
| 0241841 | 11/1985 | Japan . |
| 61-274673 | 12/1986 | Japan . |
| 61-280260 | 12/1986 | Japan . |

(List continued on next page.)

OTHER PUBLICATIONS

Anderson et al., "The Terminology and Methodology Associated with Basic Starch Phenomena," *Cereal Foods World*, vol. 33, No. 3, p. 306 (Mar. 1988).

Atwell et al., "The Terminology and Methodology Associated with Basic Starch Phenomena," *Cereal Foods World*, vol. 33, No. 3, p. 306 (Mar. 1988).

Continuous Twin—Screw Processing-Future Oriented Technology, Werner & Pfleiderer Corporation, 663 East Cresent Avenue, Ransey, N.J. (undated).

*Koch-und Extrudier-Techniken*, "Biscuits", Internationales Susswaren-Institut (1982).

Leung et al. "Storage Stability of a Puff Pastry Dough with Reduced Water Activity," *J. Food Science*, vol. 49, No. 6, p. 1405 (Nov.-Dec. 1984).

(List continued on next page.)

U.S. PATENT DOCUMENTS

| | | |
|---|---|---|
| 4,802,838 | 2/1989 | Schaaf . |
| 4,828,853 | 5/1989 | Banks et al. ............... 426/94 |
| 4,844,937 | 7/1989 | Wilkinson et al. ............ 426/559 |
| 4,844,938 | 7/1989 | Amamoto et al. ............ 426/589 |
| 4,851,247 | 7/1989 | Greenhouse et al. ......... 426/250 |
| 4,892,471 | 1/1990 | Baker et al. . |
| 4,900,572 | 2/1990 | Repholz et al. .............. 426/282 |
| 4,911,939 | 3/1990 | Lou et al. .................... 426/241 |
| 4,948,611 | 8/1990 | Cummins . |
| 4,948,612 | 8/1990 | Keller et al. . |
| 4,990,348 | 2/1991 | Spratt et al. ................. 426/242 |

FOREIGN PATENT DOCUMENTS

| | | |
|---|---|---|
| 291249 | 8/1985 | Netherlands . |
| 86/06938 | 12/1986 | PCT Int'l Appl. . |
| 0558141 | 12/1943 | United Kingdom . |
| 1175595 | 12/1969 | United Kingdom . |
| 1254562 | 11/1971 | United Kingdom . |
| 1471108 | 4/1977 | United Kingdom . |
| 1561190 | 2/1980 | United Kingdom . |
| 2131670 | 6/1984 | United Kingdom . |
| 2132868 | 7/1984 | United Kingdom . |
| 2136666 | 9/1984 | United Kingdom . |

OTHER PUBLICATIONS

Lorenz et al., "Baking with Microwave Energy," *Food Technology*, pp. 28–36 (Dec. 1973).

Mercier et al., *Extrusion Cooking*, pp. 347–353 and 404–415 (1989).

Nestl, Birgit, Doctoral Thesis, Entitled, "Formula and Process Optimization for the Extrusion of Baked Goods Under Particular Consideration of Various Lipids and Sweetners (Dietetic Products and Products with Different Nutritional Value)," Justus-Liebig University of Giessen, Giessen, W. Germany (filed Mar. 1989).

Processing: Extruded Snacks, Werner and Pfleiderer, GmbH, Postfach 30 1220 Theodorstrasse 10 7000 Stuttgart 30, West Germany (undated).

Rossen et al., "Food Extrusion," *Food Technology*, pp. 46–53 (Aug. 1973).

Sanderude, K., "Continuous Cooking Extrusion: Benefits to the Snack Food Industry," *Cereal Science Today*, vol. 14, No. 6, pp. 209–210 and 214, (Jun. 1969).

Unique Cooker Extruder, Food Engineering Intl., pp. 41–43 (May 1983).

Woollen, A., "Higher Productivity in Crispbread", *Cereal Foods World*, vol. 30, No. 5, pp. 333–334 (May 1985).

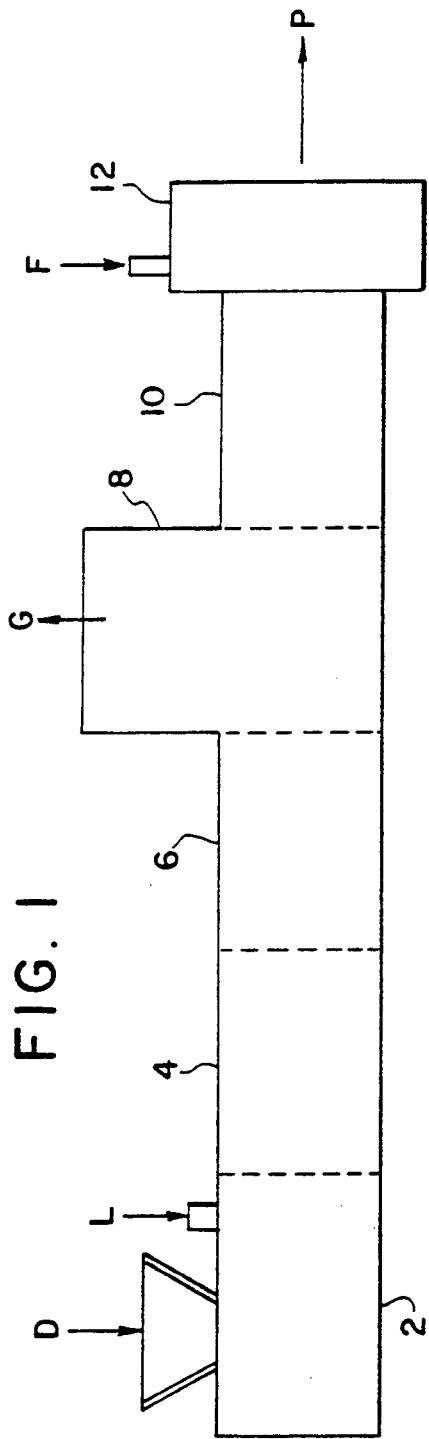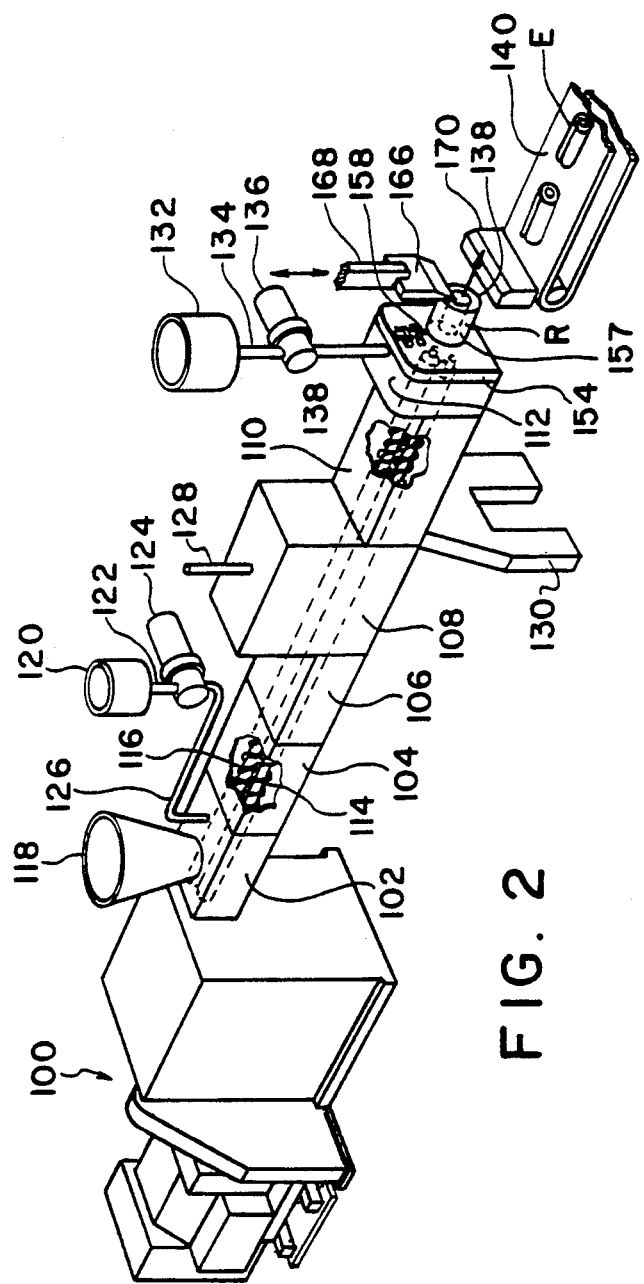

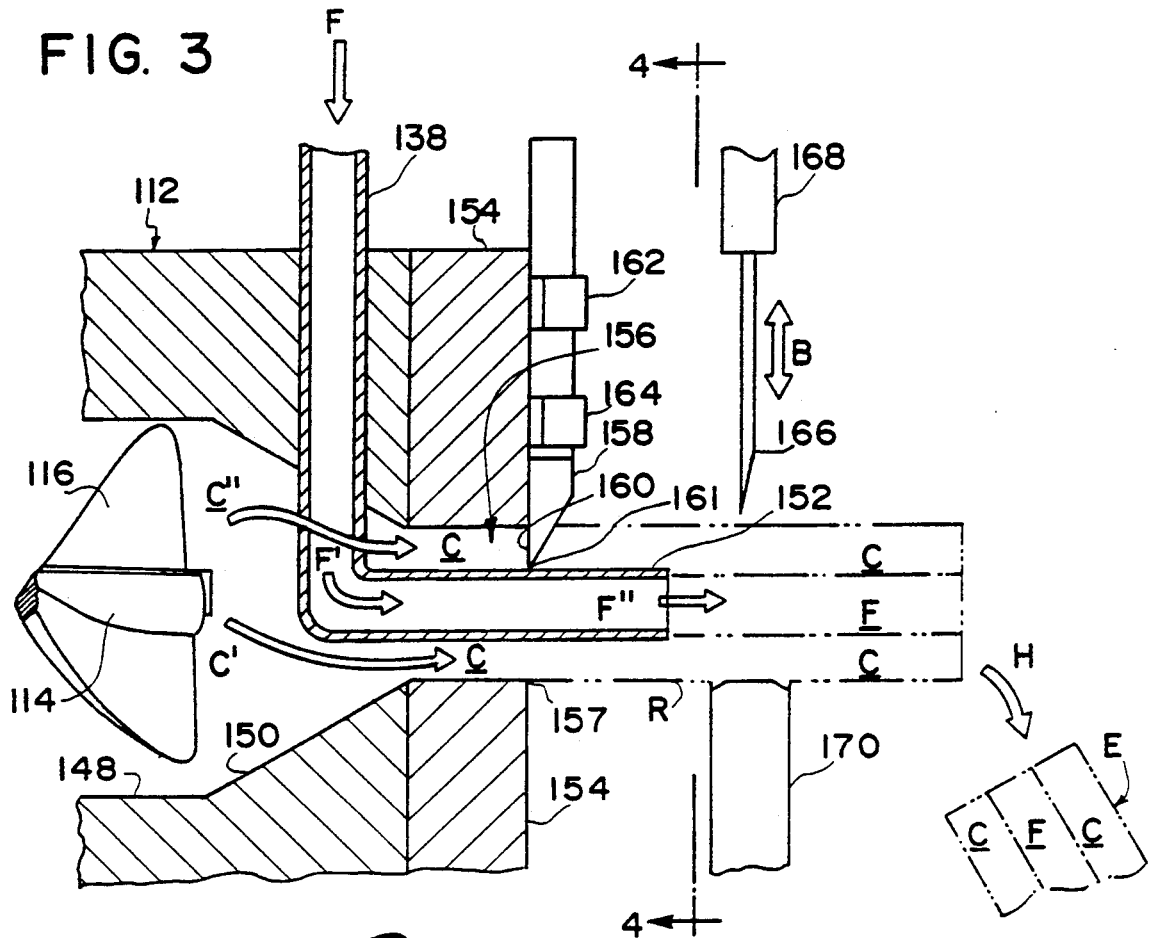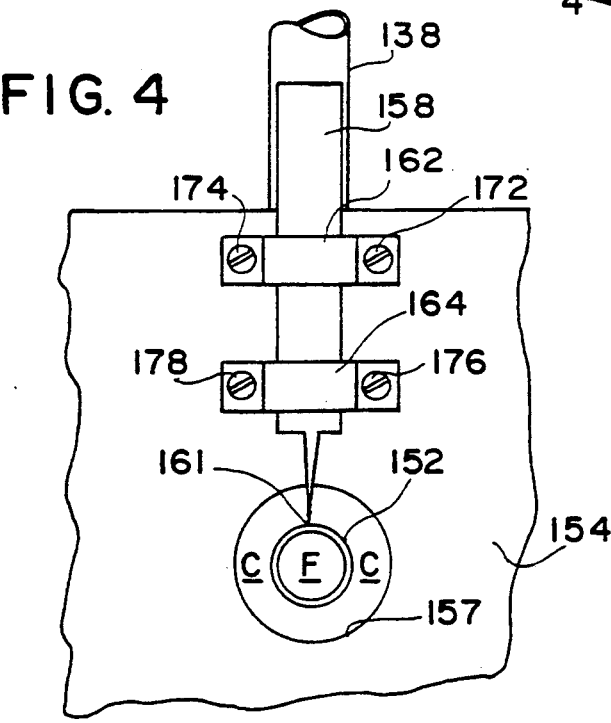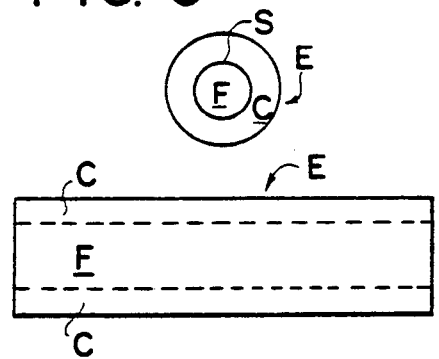

FILLED, MICROWAVE EXPANDABLE SNACK FOOD PRODUCT AND METHOD AND APPARATUS FOR ITS PRODUCTION

BACKGROUND OF THE INVENTION

It has become common practice in the food industry to market food compositions, particularly snack food products, in a partially-finished form known as half products. The consumer must then finish preparing the product by heating it. In this final heating step, the half product is caused to expand or puff due to pressure generated by expansion of trapped moisture in the half product.

When used to produce expanded cereals, half products can be gun puffed. Such puffing cannot, however, be conducted at home by consumers due to the need for specialized equipment Puffed snacks can also be prepared by deep fat frying the half products. However, such snack products suffer from the disadvantage of having fat levels up to 35% which elevates their caloric content and limits their shelf life.

These problems are avoided by puffing or expanding half products by microwave heating, as described in U.S. Pat. Nos. 4,251,551 ("'551 patent") and 4,409,250 ("'250 patent") both to Van Hulle et al. (collectively "the Van Hulle patents"). In the '551 patent, a cheese-coated snack product is formed, while the '250 patent is directed to a sugar-coated product. In both cases, the half product is prepared in the form of pellets which are then dispersed through or matrixed in a puffing medium which comprises an edible fatty triglyceride in the case of the cheese-flavored products and a nutritive carbohydrate sweetening agent in the case of the sugar-coated products.

When the pellets of the Van Hulle patents are subjected to microwave heating without the surrounding puffing media, not all the pellets undergo puffing. Further, localized over-heating of portions of some pellets can occur, resulting in visually unattractive products and localized charring which creates off-flavors. To avoid these problems, the pelletized half products of the Van Hulle patents are combined with the puffing media during microwave heating.

Another problem with the Van Hulle patents is that flavoring is not applied to the half product until the half product is dispersed in a puffing media containing flavoring and subjected to microwaves. Uniform coverage of flavoring over the puffed product is thus dependent upon a good distribution of half product through the puffing media. Since achievement of such a distribution is unlikely, some of the puffed half product will be heavily coated with flavoring, while some of it will not be adequately covered.

The pelletized form of the half product disclosed by the Van Hulle patents is simply configured to expand in place when subjected to microwaves. Although visualization of this phenomena has some consumer appeal, the inability of these half products to move during expansion is not particularly dynamic.

SUMMARY OF THE INVENTION

The present invention relates to a tubular snack half product having an expandable casing within which is an edible filling.

The casing is formed from a cooked dough containing a cereal material, starch, and water. In addition, a partially or completely pregelatinized and/or chemically modified starch is incorporated in the dough. A microwave absorptive material, such as a sugar or a salt, can also be added to the dough to assist in puffing of the filled product when subjected to microwaves. Further, a dough emulsifier is often incorporated in the dough to ease processing.

The filling is usually a blend of an edible oil and flavoring. By incorporating this filling material within the casing, a desired quantity of flavoring will be coated on the casing when puffed.

The filled half product of the present invention can be microwaved by consumers to produce a hot, fresh, puffed snack. The puffing media of the Van Hulle patents is not needed, because the dough ingredients of the present invention are selected and proportioned to expand satisfactorily and uniformly when subjected to microwaves.

In one embodiment of the present invention, a longitudinal slice is put in the casing without extending substantially into the filling to enable the casing of the half product to curl open when subjected to microwaves. This relatively dynamic expansion is visually attractive to consumers.

The filled half product of the present invention is prepared by mixing cereal material, water, and, optionally, starch, the microwave absorptive material(s), and/or the emulsifier to form a dough, cooking the dough at an elevated temperature and pressure to gelatinize the starch, venting the dough to reduce its temperature and moisture content, cooling the cooked dough to a temperature at which it can be coextruded with the filling material, and cross-sectionally cutting the resulting extrudate. When the longitudinal slice is to be made in the casing, this is done after the casing is extruded but prior to when it is contacted with the filling.

The process is carried out in a co-rotating twin screw extruder, having several processing sections. After the dough ingredients are fed to a feed section of the extruder, they are conveyed and mixed into a dough in a mixing section. The dough is then cooked in a cooking section by heat from the combination of friction generated by rotation of the screws and an external heat source. The cooked dough then enters a vacuum section in which the temperature and water content are reduced by pressure reduction. Next, the dough passes through a cooling section which adjusts the dough temperature to permit extrusion and cutting. A coextrusion apparatus, comprising a die and filling conduit, is connected to the cooling section. The twin screws force cooked dough through the die and around the conduit through which filling material is extruded. As a result, the casing is extruded as a hollow tube with filling inside it. The extrudate is then cut cross-sectionally into smaller pieces. When the longitudinal cut is to be made in the casing, a knife, secured downstream of the casing extrusion die, extends down to the exterior of the filling extrusion conduit.

BRIEF DESCRIPTION OF THE DRAWINGS

FIG. 1 is a schematic flow diagram illustrating the process for producing the half product of the present invention.

FIG. 2 is a perspective view of the apparatus for producing the half product of the present invention.

FIG. 3 is a side cross-sectional view of the extrusion zone and downstream cutters for the apparatus of the present invention.

FIG. 4 is an end view of the extrusion zone and downstream cutters for the apparatus of the present invention.

FIG. 5 is an end view of the half product of the present invention.

FIG. 6 is a side view of the half product of the present invention.

DETAILED DESCRIPTION OF THE INVENTION

Figure 7:
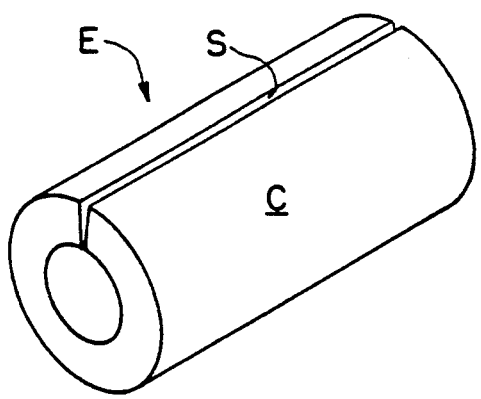
FIG. 7 is a perspective view of the half product of the present invention.

FIG. 1 is a schematic flow diagram illustrating the process for producing the half product of the present invention.

Initially, dry feed D and liquid feed L, which ultimately form the outer casing of the half product, are all supplied to feed zone 2. The dry feed D includes cereal material, and, optionally, a partially or completely pre-gelatinized and/or chemically modified starch, a dough emulsifier, and/or microwave absorptive materials.

The cereal material can be ground or milled corn, wheat, rice, oats, potato, barley, and mixtures thereof. Such products include corn meal, corn flour, wheat flour, rice flour, oat flour, potato flour, and mixtures thereof. Generally, the cereal material comprises 50 to 100 weight percent, preferably 75 weight percent of dry feed D. While corn, wheat, or potato flours can each be used as the sole cereal material employed to prepare the dough, it is preferred that oat flour be used only in admixture with another cereal material, and that in any such admixture, the content of oat flour is preferably less than about 10 percent. When so used, it has been found that oat flour is advantageous, because it acts as a processing aid, reduces extruder torque, and improves cutability of the extruded products. It has also been found that when rice flour is employed as the sole cereal material, the products have properties inferior to those achieved when using corn, wheat, or potato flour. However, rice flour can be used as a minor component in admixture with the latter flours.

The starch can be derived from cereals or roots such as wheat, corn, rice, rye, potato, tapioca, legumes, and mixtures thereof. The preferred starch is a starch which contains a high level of amylopectin or a modified amylopectin-rich starch (e.g., BAKA SNACK from National Starch and Chemical Company, Bridgewater, NJ). These preferred starches improve the puffability of the half product obtained by the process of the invention. The starch comprises 0 to 25 weight percent, preferably 15 weight percent of dry feed D.

The microwave absorptive material can be a sugar, an edible salt, low molecular weight carbohydrates (e.g., dextrins), polyalcohols (e.g., glycerol), or mixtures thereof. Suitable salts include sodium chloride, potassium chloride, calcium chloride, and mixtures thereof, preferably sodium chloride. The sugars can be sucrose, glucose, fructose, lactose, and mixtures thereof, with sucrose being preferred. The salts are usually present in the dry feed D in an amount of 0 to 5.0 weight percent, preferably 3.0 weight percent, while the sugar is present in an amount of 0 to 18 weight percent preferably 7.0 weight percent.

The emulsifier can be glyceryl mono-stearate, acetylated monoglycerides, glycerol esters, lecithin, monoglycerides, di-glycerides, sodium stearyl-2-lactylate, and mixtures thereof. The emulsifier is preferably present in an amount of 0 to 1.0 weight percent, preferably 0.5 weight percent, of dry feed D. By employing emulsifiers, processing of the dough for the half product of the invention is significantly eased.

In addition to dry feed D, liquid feed L is added to feed zone 2. The liquid feed L can include water or an aqueous solution containing the previously discussed microwave absorptive materials and/or water soluble flavors. In addition, liquid fat containing an emulsifier can be added. To achieve satisfactory gelatinization of the starch and to produce a half product with the desired properties, it is necessary to add at feed zone 2, 0.15 to 1.0 lbs., preferably 0.30 lbs., of water per pound of dry feed D. When the water is blended with dry feed D in mixing zone 4 to form a dough with over 45 weight percent water, the dough would normally cause problems in the subsequent extrusion and cutting steps of the process. However, the water content is later reduced to a satisfactory level prior to extrusion, as discussed in detail below.

After dry feed D and liquid feed L are fed to feed zone 2, they are conveyed to mixing zone 4 where dry feed D and liquid feed L are blended into a dough. In mixing zone 4, the dough formed within it is heated to a temperature of 50° C. to 150° C., preferably 60° C. Once dry feed D is mixed with liquid feed L, the resulting dough has 50 to 85 weight percent cereal material, 0 to 15 weight percent gelatinized starch, 13 to 50 weight percent water, 0 to 12 weight percent sugar, 0 to 4 weight percent salt, and 0 to 1 weight percent emulsifier.

From mixing zone 4, the dough is conveyed to cooking zone 6 where it is heated to a temperature of 100° C. to 180° C., preferably 120° C. During cooking, the pressure of the dough is elevated to a level of 2 to 30 bars, preferably 10 bars.

The cooked dough is next conveyed to vent zone 8 where the pressure of the cooked dough is reduced as a result of gas G being vented. Venting serves a number of purposes. When pressure in the cooked dough is reduced, water in the cooked dough is released in the form of steam. Consequently, the water content of the product is reduced to a level at which the final extrusion and cutting steps can be carried out without the low viscosity processing problems encountered at higher water levels. Venting to atmospheric pressure is usually sufficient for laboratory-sized extruders; however, with production-sized extruders, it may be necessary to draw vacuum on the dough down to 700 millibars with a vacuum pump (not shown). Venting reduces the temperature of the cooked dough to a level of 85° C. to 120° C., preferably 95° C., and reduces its moisture content to a level of 18 to 25 percent, preferably 22 percent.

After being vented, the cooked dough is conveyed to cooling zone 10 where its temperature is reduced to a level of 70° C. to 110° C., preferably 85° C. As a result of such cooling, the dough returns to a temperature at which its viscosity is increased to a level at which it can be extruded and cut.

After being cooled, the dough passes into extrusion zone 12, where it is coextruded with and around filling F as final product P. The filling F includes an oil such as partially hydrogenated soybean oil, cottonseed oil, corn oil, and mixtures thereof. Filling F also includes a flavoring such as cheese, peanut butter, sour cream, onion, and/or mixtures thereof. When a cheese flavored half product is desired, the filling includes oil, cheese flavor, cheese solids, and salt. Filling F is comprised of 30 to 70, preferably 60, weight percent oil and 30 to 70, preferably 40, weight percent flavoring. The ratio of cooked dough to filling in final product P is 4:1 to 1:4, preferably 1:1. Generally, coextrusion is effected through a die with the cooked dough assuming the configuration of a hollow rod of any cross-section (e.g., circular, square, rectangular) and having a filling within the rod.

A longitudinal slice is then preferably cut through the dough, and final product P is sliced cross-sectionally. After cutting, the product is stored at 15° C. to 35° C., preferably 20° C., and at a relative humidity of 30 percent to 70 percent, preferably 50 percent, until the moisture content of the product is below 10%. After this process of tempering is completed, final product P is packaged for sale to consumers.

FIG. 2 is a perspective view of the apparatus for producing half products according to the present invention which corresponds generally to FIG. 1. Feed section 102, mixing section 104, cooking section 106, venting section 108, cooling section 110, and extrusion section 112 of FIG. 2 each correspond to feed zone 2, mixing zone 4, cooking zone 6, vent zone 8, cooling zone 10, and extrusion zone 12, respectively, of FIG. 1. The sections are serially-connected and have a total length of 24 to 36, preferably 30, times the diameter of each of the screws. A pair of screws 114 and 116, powered by drive mechanism 100, rotate to advance material through the various sections. In such devices, the pitch of screws 114 and 116 in each of the different sections can be varied along with the length of these sections to adjust the residence time of and the amount of mechanical energy introduction into the dough in each section. In feed section 102, dry materials are charged through dry feed hopper 118, while liquid is fed through liquid feed hopper 120, suction conduit 122, pump 124, and discharge conduit 126. In mixing section 104, screws 114 and 116 are provided with intermeshing kneading elements which effect low shear mixing and kneading of dry feed D and liquid feed L from feed section 102. The resulting dough is heated in mixing section 104 and cooking section 106 by means of heating elements (not shown) which heat the walls of these sections. In vent section 108, gas is discharged through vent pipe 128. In cooling section 110, the temperature is reduced by means of cooling elements (not shown) which cool the walls of this section. Filling material is charged to extruder 112 by means of filling hopper 132, suction conduit 134, pump 136, and discharge conduit 138. After coextrusion and longitudinal cutting, which FIGS. 3 and 4 show in more detail, the filled half product is conveyed as a continuous rope R to a vertically movable knife 166 which cross-sectionally cuts the product into individual pieces of filled half product E. Pieces E then drop on to conveyor 140.

Generally, devices like that shown in FIG. 2 are well known in the art, except for the extrusion and cutting detail shown in FIGS. 3 and 4 and the use of an apparatus for producing filled half products. Examples of such equipment include cooker-extruder Model Nos. ZSK 57, ZSK 30, and Continua-type machines, which are available from Werner and Pfleiderer Corporation, 663 East Crescent Avenue, Ramsey, NJ 07446.

FIG. 3 is a side cross-sectional view of extruder 112 and downstream cutters for the apparatus of the present invention. In extruder 112, the cooked dough, confined by screw section walls 148 and tapered walls 150, follows paths C' and C" around discharge conduit 138 and extrusion conduit 152. Cooked dough C is then forced out of die passage 156 which is defined by die block 154. Meanwhile, filling F is injected into discharge conduit 138 where it follows the path defined by arrows F' and F" until discharged through the end of extrusion conduit 152.

While cooked dough C is being discharged through die passage 156, a longitudinal slice is cut through it by cutting edge 160 of stationary blade 158. As can be seen in FIG. 3, cutting edge 160 extends to the exterior of extrusion conduit 152 so that the slice passes through the dough. As shown in FIG. 3 and in more detail in FIG. 4, which is an end view of extruder 112 and the downstream cutter of the present invention taken along line 4—4 of FIG. 3, stationary blade 158 is anchored onto die block 154 by fastening bands 162 and 164 through which screws 172, 174, 176, and 178 extend.

When filling F passes out of extrusion conduit 152 and joins with cooked dough C, which has already passed through die orifice 157 and die block 154, cooked dough C assumes the form of a tubular rope R having a casing C within which is filling F. The rope is then cut into shorter pieces E by movable knife 166, mounted on support 168, which follows path B into and away from engaging contact with cutting base 170. When such cutting is effected, the resulting extrudate E follows path H downwardly onto conveyor 140 (shown in FIG. 2).

FIG. 5 is an end view of the extrudate half product E of the present invention showing cooked dough casing C surrounding filling F and having slice S. FIG. 6 is a side view of the extrudate half product E of the present invention, while FIG. 7 is a perspective view of this product.

Figure 8:
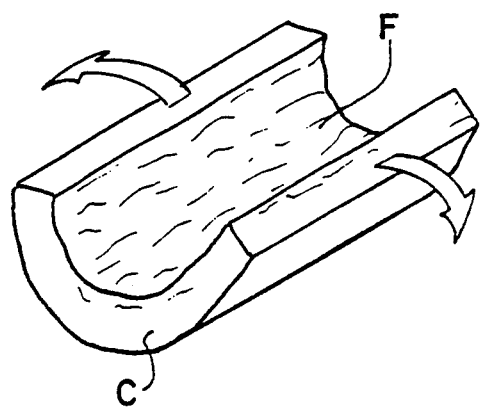
FIG. 8 is a perspective view of a partially expanded half product of the present invention.
Figure 9:
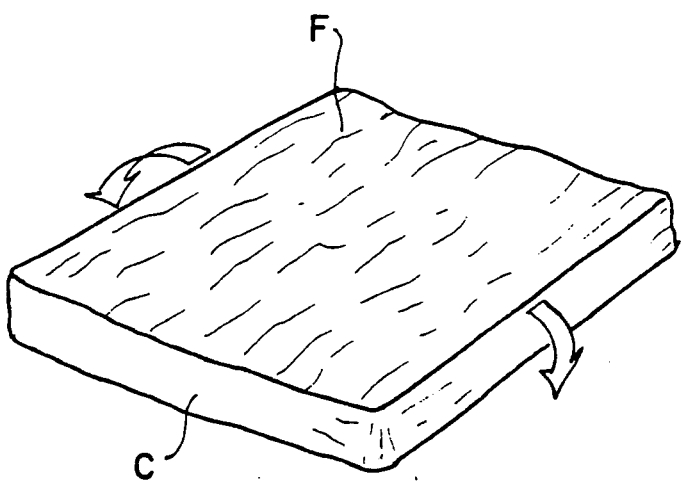
FIG. 9 is a perspective view of a partially expanded half product of the present invention which has been expanded beyond the state shown in FIG. 8.
Figure 10:
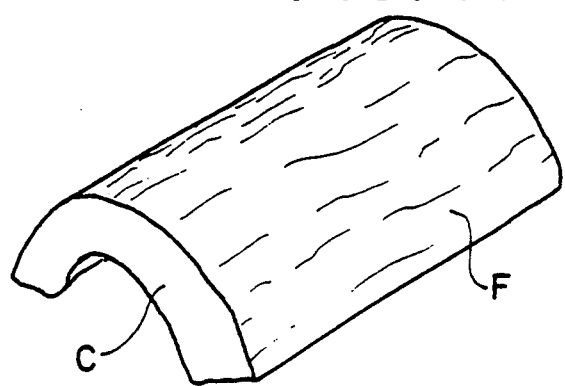
FIG. 10 is a perspective view of a fully expanded half product of the present invention.

When the half product of the present invention, as shown in FIGS. 5–7, is subjected to microwaves, the temperature at the interface between cooked dough casing C and filling F rises. As a result, moisture at the interface between the cooked dough casing C and filling F evaporates, forming bubbles. Since cooked dough casing C is initially in a glassy state, it cannot be deformed until it warms up. Such warming is accelerated by the sugar, salt, and moisture ingredients in casing C which absorb microwaves. As casing C begins to soften, it expands and starts to curl open at slice S, as shown in FIG. 8. The ends of casing C continue to open by moving in the direction of the arrows in FIG. 8 until the product assumes the configuration in FIG. 9. During such expansion, filling F remains on the surface which originally formed the interior of casing C. By the time microwaving is completed, the filled half product of the present invention has further expanded and opened in the direction of the arrows in FIG. 9 until the product assumes the final inverted curl of FIG. 10. In this form, the product has an outer surface coated with flavoring material F and an inner surface with very little flavoring material. From FIGS. 7–10, it is apparent that the filled half product of the present invention constitutes a dynamically-expandable snack food for preparation at home by consumers.

EXAMPLE 1

A dry mix consisting of 30 parts by weight of wheat flour, 30 parts by weight of corn flour, 10 parts by weight of pregelatinized starch (i.e., BAKA SNACK), 4.2 parts by weight of sugar, and 2.1 parts by weight of sodium chloride salt was fed into a Werner Pfleiderer ZSK-30 cooker-extruder at a rate of 20 lbs/hr. In addition, water was fed to the extruder at a rate of 5 lbs/hr. The extruder, having a total length of 36 times the screw diameter, was set up with heating/cooling control zones to maintain the following temperatures:

| Heating/Cooling Zone | 1 | 2 | 3 | 4 | 5 |
| --- | --- | --- | --- | --- | --- |
| Temperature | 60° C. | 90° C. | 115° C. | 95° C. | 85° C. |

The dry mix and water were charged to Zone 1 of the cooker-extruder. In Zone 2, the dry mix and water were blended to form a dough which was heated so that the starch began to gelatinize, and the dough formed a plasticized mass. The cooking was completed at the end of Zone 3. The cooked dough was then transported to Zone 4 where some of the heat and steam were removed through a vent port. The cooked dough mass was further cooled in Zone 5 before exiting through a die orifice as a cooked half product.

The extruder die consisted of a plate with a cylindrical die passage. A tubular conduit with an inside diameter of 3.5 mm and an outside diameter of 5.5 mm was placed in the die passage. A sharp knife, mounted to the die plate, extended to the outside surface of the tubular conduit.

With this arrangement, a heat stable oil-based cheese filling was coextruded through the tubular conduit at a rate of 7 lb/hr. As the cooked dough was extruded, a longitudinal slice was cut in the dough at the exit of the die passage. The cheese filled extrudate was then cut cross-sectionally into ½" long pieces by a knife. The extrudate pieces were then dried and conditioned at a temperature of 25° C. and at a 50% relative humidity until they reached an equilibrium.

The conditioned extrudate product was puffed to at least six times its original size by microwave heating for two minutes at high power. A crunchy snack product with a light texture and a pleasant cheese flavor was obtained.

EXAMPLE 2

Example 1 was repeated, except that peanut butter filling was used. The resultant half product was a tube filled with peanut butter filling which could be expanded with microwaves to produce a peanut butter coated snack product.

EXAMPLE 3

Example 1 was repeated, except that 0.05 parts by weight of glycerol mono-stearate was additionally incorporated into the dry mixture. The resultant puffed snack product had a denser texture than the puffed snack product of Example 1.

EXAMPLE 4

Example 1 was followed except that the flour material was all corn flour. The resultant puffed snack product had a characteristic corn taste.

Although the invention has been described in detail for the purpose of illustration, it is understood that such detail is solely for that purpose, and variations can be made therein by those skilled in the art without departing from the spirit and scope of the invention which is defined by the following claims.

We claim:

1. A filled, longitudinally-extending microwave-expandable food product comprising:
   an outer half-product casing having a hollow interior and extending substantially along the longitudinal extent of said food product and formed from a cooked glassy dough including a cereal material and water, wherein the cereal material and the water are present in the cooked glassy dough in proportions which will enable said casing to expand to puff open when subjected to an effective dose of microwaves and
   an inner filling within and contacting an inner surface of said outer casing and extending substantially along the longitudinal extent of said food product, wherein said inner filling includes an edible oil and flavoring in proportions which will enable said filling to spread over said casing as it is expanded by microwaves,
   said casing having a slide along it longitudinal extent and extending substantially through said casing to enable the casing to cure open to form a product having an inverted curl when subjected to said microwaves.

2. A food product according to claim 1, wherein the dough further comprises a partially or completely pregelatinized and/or chemically modified starch derived from cereals or roots selected from the group consisting of wheat, corn, rice, rye, potato, tapioca, legumes, and mixtures thereof.

3. A food product according to claim 2, wherein the dough further comprises an edible microwave absorptive material selected from the group consisting of a salt, a sugar, low molecular weight carbohydrates, polyalcohols, and mixtures thereof.

4. A food product according to claim 3, wherein the dough further comprises an emulsifier selected from the group consisting of glyceryl monostearate, acetylated monoglycerides, glycerol esters, lecithin, monoglycerides, diglycerides, sodium stearyl-2-lactylate, and mixtures thereof.

5. A food product according to claim 4, wherein the dough comprises 50 to 85 weight percent of the cereal material, 0 to 15 weight percent of the pregelatinized starch, 13 to 50 weight percent of the water, 0 to 12 weight percent sugar, 0 to 4 weight percent sodium chloride, and 0 to 1 weight percent emulsifier.

6. A food product according to claim 1, wherein the cereal material is selected from the group consisting of corn meal, corn flour, wheat flour, rice flour, oat flour, potato flour, barley, and mixtures thereof.

7. A food product according to claim 1, wherein said filling comprises 30 to 70 weight percent of the oil and 30 to 70 weight percent of the flavor.

8. A food product according to claim 1, wherein the weight ratio of said casing to said filling is 4:1 to 1:4.

9. A food product according to claim 1 which has been expanded with microwaves.

10. A method of producing a filled, longitudinally-extending, microwave-expandable food product comprising:
- mixing cereal material and water to form a dough having a moisture content of 13 to 50 weight percent;
- cooking said dough at a temperature and pressure which will gelatinize starch in the cereal material;
- reducing the pressure of the cooked dough and reducing its moisture content to a level of 18 to 25 weight percent;
- cooling the cooked dough to a temperature at which the cooked dough can be cut and extruded;
- extruding the cooled, cooked dough in a form having a hollow interior; and
- extruding a filling including an edible oil and flavoring substantially simultaneously with said extruding the cooled, cooked dough such that the filling is extruded into the hollow interior of the cooled, cooked dough to produce said filled, longitudinally-extending, microwave-expandable food product.

11. A process according to claim 10, wherein the dough further comprises:
- a partially and/or completely pregelatinized and/or chemically modified starch;
- an edible microwave absorptive material selected from the group consisting of a salt, sugar, low molecular weight carbohydrates, polyalcohols, and mixtures thereof and
- an emulsifier selected from the group consisting of glyceryl monostearate, acetylated monoglycerides, glycerol esters, lecithin, mono-glycerides, diglycerides, sodium stearyl-2-lactylate, and mixtures thereof.

12. A process according to claim 10, wherein said cooking is conducted at a temperature of 110° C. to 180° C. and at a pressure of 2 to 30 bars.

13. A process according to claim 10, wherein said reducing the pressure of the cooked dough lowers the pressure of the cooked dough to a level of 2 to 10 bars and reduces the temperature of the cooked dough to a level of 85° C. to 120° C.

14. A process according to claim 10 further comprising:
- tempering said filled, longitudinally-extending, microwave-expandable food product by maintaining said food product at a temperature of 15° C. to 35° C. and a relative humidity of 30 to 70 percent.

15. A process according to claim 10, wherein said cooling is at a temperature of 70° C. to 110° C.

16. A process according to claim 10, wherein said mixing, said cooking, said reducing the pressure of the cooked dough, and said cooling are effected in individual, consecutive sections through which co-rotating twin screws extend.

17. A process according to claim 16, wherein said extruding the cooled, cooked dough and said extruding the filling are effected in a coextrusion device comprising:
- a dough die connected to and located downstream from the cooling section and
- a filling conduit entering and extending through said dough die along a path substantially coaxial with the extruded dough to a point beyond said dough die, wherein said cooked dough is extruded around the simultaneously-extruded filling.

18. A process according to claim 17 further comprising:
- cutting through the dough as it is extruded to said filling conduit, whereby said filled, longitudinally-extending, microwave-expandable food product has a longitudinal slice substantially through the cooled, cooked dough without extending substantially into the filling.

19. A process according to claim 10 further comprising:
- cutting cross-sectionally through the dough and the filling after they are extruded, whereby said filled, longitudinally-extending, microwave-expandable food product is divided into pieces.

* * * * *

UNITED STATES PATENT AND TRADEMARK OFFICE
CERTIFICATE OF CORRECTION

PATENT NO. : 5,124,161
DATED : June 23, 1992
INVENTOR(S) : van Lengerich, et al

It is certified that error appears in the above—identified patent and that said Letters Patent is hereby corrected as shown below:

On the title page:

Please add the following disclaimer to the patent:

--The portion of the term of this patent subsequent to March 12, 2008 has been disclaimed.--

Signed and Sealed this

Tenth Day of August, 1993

Attest:

MICHAEL K. KIRK

*Attesting Officer*     Acting Commissioner of Patents and Trademarks